(No Model.)
C. L. COFFIN.
PROCESS OF ELECTRIC METAL HEATING.
No. 483,426. Patented Sept. 27, 1892.
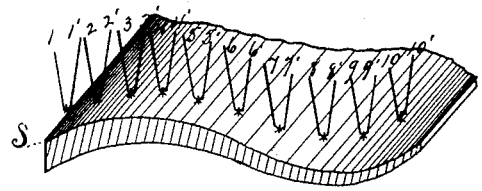
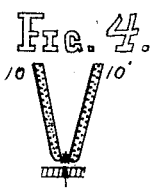
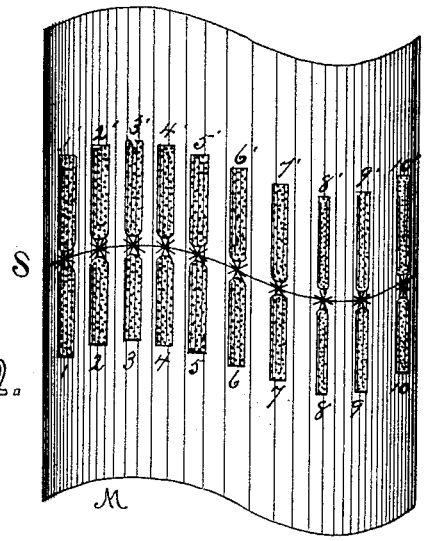
Fig. 1.   Fig. 2.   Fig. 5.
Witnesses
Gertrude H. Anderson
Geo. H. Lothrop
Inventor:
Charles L. Coffin

UNITED STATES PATENT OFFICE.

CHARLES L. COFFIN, OF DETROIT, MICHIGAN.

PROCESS OF ELECTRIC METAL-HEATING.

SPECIFICATION forming part of Letters Patent No. 483,426, dated September 27, 1892.

Application filed January 26, 1892. Serial No. 419,335. (No specimens.)

*To all whom it may concern:*

Be it known that I, CHARLES L. COFFIN, of Detroit, in the county of Wayne and State of Michigan, have invented a new and useful Improvement in the Process of Welding or Working Metals Electrically, of which the following is a specification.

My invention consists in an improved process of welding or working metals electrically, hereinafter fully described and claimed.

The figures are diagrams illustrating my invention, Figures 2 and 5 being plans; Fig. 1, a cross-section on line $x\,x$, Fig. 2; Figs. 3 and 4 being sections on lines $a\,a$ and $b\,b$, Fig. 2, and Fig. 6 being a perspective.

In welding or working sheet metal it is sometimes necessary to operate upon sheets which are of different thicknesses in different parts. For instance, the sheet M, as shown in Figs. 1 and 6, is thicker at one side than at the other. In operating upon material of this kind with a plurality of arcs (which forms the subject-matter of another application filed by me contemporaneously with this one, Serial No. 419,334) it is quite desirable to graduate the size and heating effect of the several arcs, so that while the thicker part of the metal is being sufficiently heated the thinner part will not be destroyed, or vice versa. To do this I proportion the size of the arc according to the cross-section of the material at the different points which are subjected to the action of the arcs.

The mode of welding which I have illustrated is that in which the metal is subjected to the action of an arc sprung between two extraneous conductors; but it is equally applicable to that process in which the arc is sprung between the material and one extraneous conductor.

M represents the material to be heated and welded, and S represents the line along which the material is to be heated.

The pairs of carbons are represented by the figures 1 1', 2 2', and so on up to 10 10', their numbers being equal to the number of arcs required.

At the thick part of the material—for instance, at the left hand in Figs. 2 and 5—I use larger carbons, as shown at 1 1, than I do at the thin part of the material—as, for instance, 9 9, Fig. 2, or 10 10, Figs. 5 and 6. I also, in some cases, put the arcs nearer together where the material is thick than where it is thin, as indicated in Fig. 5. In this manner by using a sufficient number of arcs the whole length of the seam to be welded may not only be heated at once, but may be heated in proportion to its cross-section so as to heat each part alike, which cannot be done, so far as I am aware, by any system of heating by fuel.

What I claim as my invention, and desire to secure by Letters Patent, is—

The herein-described process of electrically heating metal of varying cross-section, consisting in simultaneously subjecting the metal at different points to the action of separate voltaic arcs, whose heating power varies in approximate proportion to the respective cross-sections of the material at the points to which the arcs are applied.

CHARLES L. COFFIN.

Witnesses:
  GERTRUDE H. ANDERSON,
  GEO. H. LOTHROP.